United States Patent [19]

Kanemaru

[11] Patent Number: 4,846,221
[45] Date of Patent: Jul. 11, 1989

[54] BALL VALVE WITH BUILT-IN CHECK VALVE

[75] Inventor: Tonaharu Kanemaru, Yamanashi, Japan

[73] Assignee: Kitz Corporation, Tokyo, Japan

[21] Appl. No.: 192,598

[22] Filed: May 9, 1988

[30] Foreign Application Priority Data

May 21, 1987 [JP] Japan .............................. 62-75240[U]

[51] Int. Cl.$^4$ ............................................. F16K 15/18
[52] U.S. Cl. ................... 137/614.17; 137/514; 251/288
[58] Field of Search ................... 137/614.17, 542, 514, 137/904; 251/288

[56] References Cited

U.S. PATENT DOCUMENTS

| | | | |
|---|---|---|---|
| 2,729,238 | 1/1956 | Hite | 137/542 X |
| 2,945,666 | 7/1960 | Freeman et al. | 251/288 X |
| 3,612,098 | 10/1971 | Bora et al. | 137/542 X |

FOREIGN PATENT DOCUMENTS

| | | | |
|---|---|---|---|
| 739863 | 11/1955 | United Kingdom | 137/614.17 |
| 748888 | 5/1956 | United Kingdom | 137/614.17 |

Primary Examiner—John Fox
Attorney, Agent, or Firm—Bruce L. Adams; Van C. Wilks

[57] ABSTRACT

A ball valve with a built-in check valve includes a valve casing having a passageway for a fluid, a ball having a through hole formed therein, also having a valve seat formed inside thereof at a position in the vicinity of one end of the through hole, and rotatably housed in the valve casing so that the through hole is capable of communicating with the passageway, a guide bush provided within the through hole for guiding the check valve, a spiral spring wound on the guide bush for biasing the check valve in the direction of forming a seal contact between the check valve and the valve seat, and rubber or resin damping members attached to the check valve. The check valve is received within the through hole for cutting off the communication between the passageway and the through hole and preventing a counter flow of the fluid, and has a sealing contact portion and a shoulder portion. The shoulder portion of the check valve abuts against an end face of the guide bush when the check valve has been retracted by pressure of the fluid exerted on the check valve against the biasing force of the spiral spring. The sealing contact portion of the check valve is brought into sealing contact with the valve seat by the biasing force of the spiral spring.

12 Claims, 3 Drawing Sheets

BALL VALVE WITH BUILT-IN CHECK VALVE

BACKGROUND OF THE INVENTION AND PRIOR ART STATEMENT

The present invention relates to a ball valve with a builtin check valve, employed in piping for transmitting a fluid such as water, oil, gas or the like, and especially, for use in piping in which the fluid is to be prevented from flowing backward.

In conventional piping for preventing a counter flow of a fluid, it has been ordinarily adopted to mount both a check valve (such as swing check valves, lift check valves, and the like) and a shutoff valve (such as gate valve, globe valves, ball valves, butterfly valves, and the like) in parallel. However, this suffers the drawbacks of high material cost and high assembly cost and requires a large exclusive space for mounting the two different valves in parallel. These are the drawbacks inherent in the conventional piping.

In view of this, there has been proposed a globe stop-end check valve which is a combination globe valve and lift check valve. This globe stop-end check valve is classified into two groups, one of which is employed in a horizontal portion of the piping and the other of which is employed in a bent portion between the horizontal portion and a vertical portion of the epiping. In other words, there is no such globe stop-end check valve which is employed in the vertical portion of the piping. In addition to this drawback, the globe stop-end check valve suffers from its large fluid resistance and a rattling noise produced when it has checked a counter flow of a fluid.

There has also been proposed a ball valve provided therein with a ball having a through hole with a built-in check valve in the through hole. In the ball valve of this type, since the direction in which a fluid flows is invariable it is necessary to always recognize the direction, and since a valve handle is often detached from and attached to a valve stem during mounting and maintenance work of the ball valve, it is necessary that the handle can easily be attached to and detached from the stem with exactitude. In the prior art ball valve, however, the stem has its upper portion formed with a pair of flat outer surfaces, and the handle has a fitting hole provided with a pair of flat inner surfaces snugly fitted on the flat outer surfaces of the stem. That is to say, the handle is mounted on the stem by a snug fitting between the pair of inner flat surfaces of the former and the pair of outer flat surfaces of the latter. In the maintenance work, for example, the mounted handle is once detached from the stem and is then attached to the stem again. In this case, if the pair of inner flat surfaces of the handle should be fitted inversely on the pair of outer flat surfaces of the stem, then the check valve will malfunction. Such inconvenience has heretofore been often encountered. Furthermore, since the conventional ball valve is not provided with any means for confirming whether the ball valve is opened or closed during the mounting or maintenance work of the ball valve, even when the valve handle is correctly mounted on the stem, it cannot be confirmed whether the ball valve is in its opening or closing condition. This leads to a fair possibility of the fluid being permitted to pass through the ball valve by mistake.

OBJECTS AND SUMMARY OF THE INVENTION

The present invention has been accomplished in view of the aforementioned problems.

One object of the present invention is to provide a ball valve with a built-in check valve, which is capable of fulfilling both a shut-off function and a checking function and making the exclusive space to be occupied thereby small and which is suitable for inexpensive mass production.

Another object of the present invention is to provide a ball valve with a built-in check valve, which can freely be mounted on any portion of piping and which has a construction such that fluid resistance is very low and that there is no fear of rattling noise being produced even when fluid pressure is exerted thereon either in the normal direction or in the reverse direction.

Still another object of the present invention is to provide a ball valve with a built-in check valve, having a construction such that a valve handle can easily be detached from a valve stem, that it is possible to immediately confirm whether the ball valve is opened or closed in the state of the handle having been detached from the stem, and that the detached handle can easily be attached with exactitude to the stem without failing to confirm the direction in which a fluid flows.

To attain the objects described above, according to the present invention, there is provided a ball valve with a builtin check valve, comprising a valve casing having a passageway for a fluid; a ball having a through hole formed therein, and having an inwardly contracted frustoconical valve seat formed inside thereof at a position in the vicinity of one end of the through hole thereof, and being rotatably housed in the valve casing so that the through hole thereof is capable of communicating with the fluid passageway of the valve casing; the check valve being received within the through hole of the ball for cutting off the communiction between the fluid passageway and the through hole and preventing a counter flow of the fluid, and comprising a valve body which has a sealing contact portion and a shoulder portion; a guide bush provided within the through hole of the ball for guiding the valve body of the check valve; a spiral spring wound on the guide bush for biasing the check valve in the direction of forming a seal contact between the sealing contact portion and the frustoconical valve seat; the shoulder portion of the valve body of the check valve abutting against an end face of the guide bush when the valve body has been retracted by pressure of the fluid exerted on the check valve against the biasing force of the spiral spring; and rubber or resin damping members attached to the sealing contact portion and shoulder portion of the valve body.

According to the present invention, there is also provided a ball valve with a check valve, comprising a valve casing having a passageway for a fluid; a ball having a through hole formed therein and being rotatably housed in the valve casing so that the through hole thereof is capable of communicating with the fluid passageway of the valve casing; the check valve being received within the through hole of the ball for cutting off the communication between the fluid passageway and the through hole and preventing a counter flow of the fluid; a valve stem associated with the ball and provided at an upper end thereof with a flat surface; a valve handle having a fittiing hole into which the upper end of the valve stem is inserted and also having an engaging surface formed in the fitting hole so that it is engageable with the flat surface of the valve stem to join the handle and the stem together; a pin member disposed in parallel to the through hole of the ball and immediately below the flat surface; and a projection formed on the upper end of a valve stem housing portion of the valve casing for serving as a stopper for the pin member rotated in conjunction with the rotation of the stem which is made by rotation of the handle.

The above and other objects, characteristic features and advantages of the present invention will become more apparent to those skilled in the art as the disclosure is made in the folowing description of the preferred embodiment of the invention, as illustrated in the accompanying drawings.

DETAILED DESCRIPTION OF THE PREFERRED EMBODIMENT

The present invention will now be described in detail with reference to the illustrated embodiment.

Figure 1:
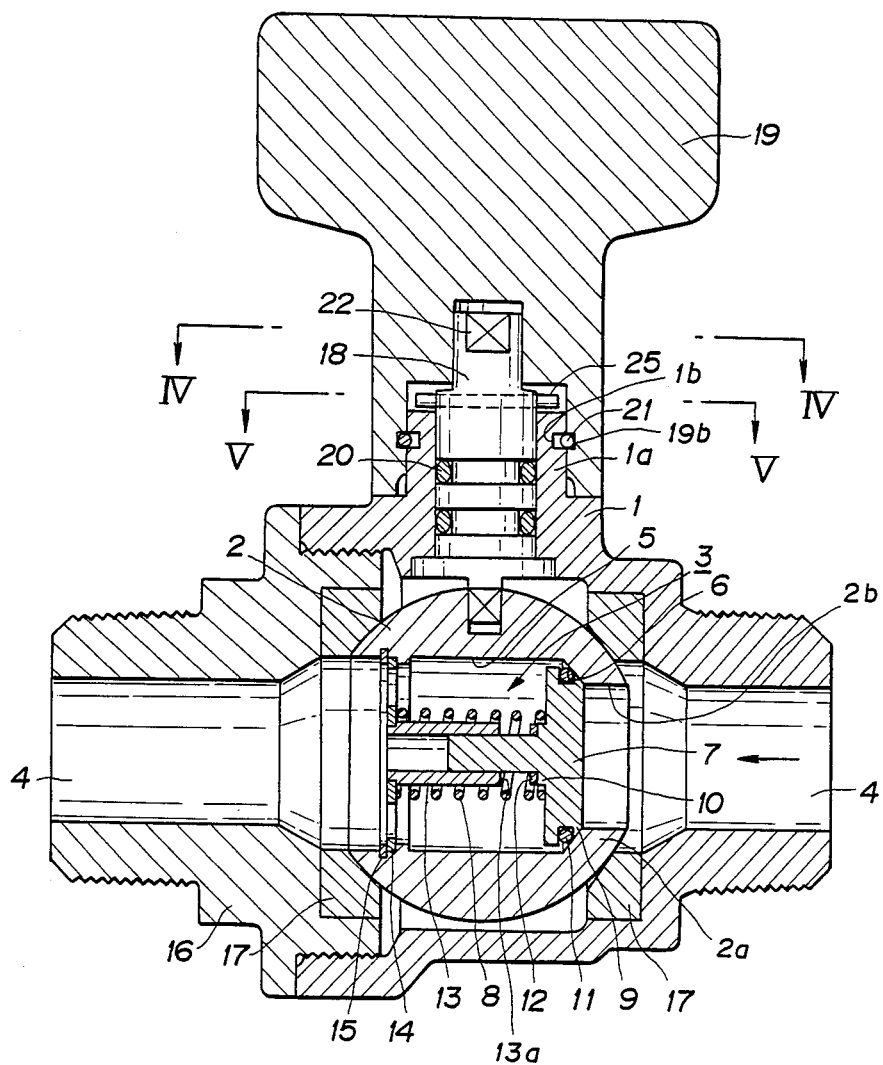
FIG. 1 is a longitudinal cross section illustrating one embodiment of a ball valve with a built-in check valve according to the present invention.
Figure 3A:
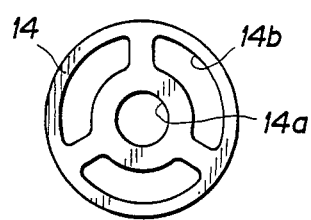
FIGS. 3(A) and 3(B) are plan views illustrating examples of bush holders usable in the ball valve of FIG. 1.
Figure 3B:
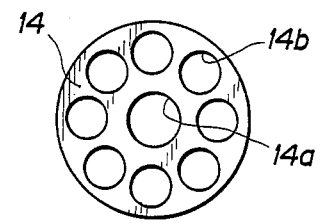

In FIG. 1, reference numeral 1 designates a valve casing having a passageway 4 formed therein, a ball or ball valve number 2 provided therein with a through hole 5 and attached to the valve casing 1 at the midway portion of the passageway 4, a check valve 3 built in the through hole 5 of the ball 2, a frustoconical valve seat 6 formed inside the ball 2 and contracted toward one end of the through hole 5, and movable check valve member in the form of a valve body 7 of the check valve 3 biased by a spiral spring 8 toward the one end of the through hole 5 so that it comes into sealing contact with the valve seat 6. With this arrangement, the check valve 3 is closed and opened by contact and separation between the valve seat 6 and the valve body 7. The valve body 7 has a sealing contact portion 9 and a shoulder portion 10 to which damping members 11 and 12 are respectively attached. The damping member 11 is an O-ring made of rubber or resin, while the damping member 12 is a ring having a rectangular cross-section and made of rubber or resin. Denoted by numeral 13 is a guide bush fixed to a bush holder 14 for guiding the valve body 7 in the directions in which the check valve 3 is closed and opened. The guide bush 13 has an end face 13a on which the shoulder portion 10 of the valve body 7 abuts through the damping member 12 when the check valve 3 has been retracted against the biasing force of the spring 8 by a fluid passing through the passageway 4. The bush holder 14 is fixed to the interior of the ball 2 by a C-shaped snap ring 15 and, as illustrated in FIG. 3(A) or FIG. 3(B), has a mounting hole 14a in which the guide bush 13 is fixed and also has a plurality of perforations 14b through which a fluid passes.

Referring again to FIG. 1, reference numeral 16 designates a cap for the valve casing 1, 17 a ball seat, 18 a valve stem, 19 a valve handle, 20 a stem seal, and 21 a snap ring. The ball 2 is supported within the valve casing 1 in the state of sealing contact with the ball seat 17 attached to the valve casing 1 and cap 16 respectively. The valve handle 19 is detachably connected to the ball 2 via the valve stem 18 so that when the handle 19 is turned or rotated by substantially 90 degrees, the ball 2 is angularly displaced or rotated in conjunction with the rotation of the handle 19 to fully close or open the ball valve. The stem seal 20 serves to prevent a fluid from leaking along the peripheral surface of the stem 18. The snap ring 21 is of a split type and is received on the bottom of an outer groove 1b formed in a stem housing portion 1a of the valve casing 1 in its fully radially contracted state and, in its fully radially expanded state, received on the bottom of an inner groove 19b formed in the handle 19 at a position corresponding to that of the outer groove 1b of the valve casing 1. When an upward force is exerted on the handle 19 in FIG. 1, the snap ring 21 is radially contracted and, therefore, the handle 19 can easily be detached from the stem housing portion 1a of the valve casing 1. After the detachment of the handle 19, the snap ring 21 is radially expanded. When the handle 19 is inserted about the stem housing portion 1a of the valve casing 1, the snap ring 21 is again radially contracted by the inner peripheral surface of the handle 19 and at the inner groove 19b of the handle 19 is radially expanded. Thus, the handle 19 can be attached again with ease.

Figure 2:
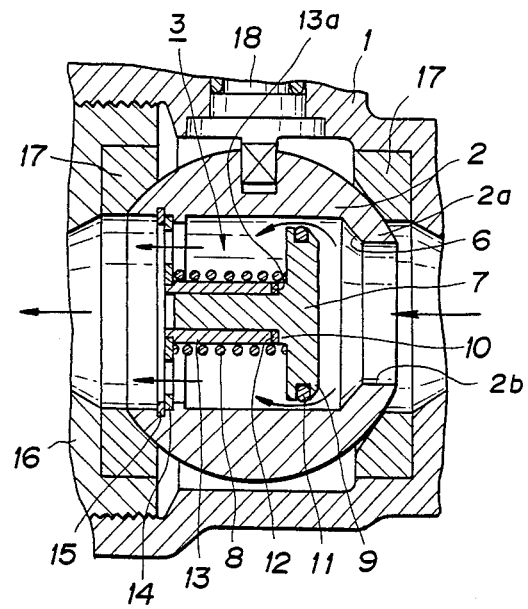
FIG. 2 is a partially cut-away, longitudinal cross section illustrating the ball valve of FIG. 1 in which the built-in check valve has been retracted by pressure of a fluid to form communication between a through hole of a ball and a passageway of the ball valve.
Figure 4:
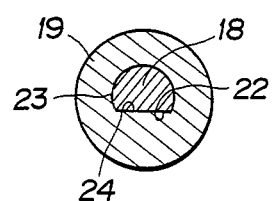
FIG. 4 is a cross section taken along ling IV—IV in FIG. 1.
Figure 5:
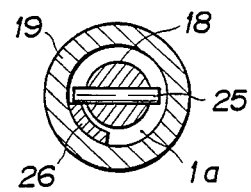
FIG. 5 is a cross section taken along line V—V in FIG. 1.
Figure 6:
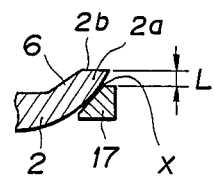
FIG. 6 is a cross section illustrating the relationship between the edge of the through hole in the ball and a ball seat.

Furthermore, as illustrated in FIG. 4, the valve stem 18 has a single upper flat surface 22 and the valve handle 19 has a fitting hole 23 having a single flat engaging surface 24 snugly fitted on the flat surface 22 of the stem 18. Therefore, mounting on the handle 19 on the stem 18 can only be obtained by the snug fitting between the single flat surface 22 and the single engaging surface 24 when the valve handle 19 and the valve stem 18 are in a predetermined orientation relative to one another. This can avoid the aforementioned malfunction of a conventional check valve having a pair of inner flat surfaces of a handle and a pair of outer flat surfaces of a stem. In addition, as illustrated in FIG. 5, the stem 18 is further provided at a position immediately below the flat surface 22 with a pin member 25 constituted by a spring pin or the like and directed in parallel to the through hole 5 of the ball 2, and the stem housing portion 1a of the valve casing 1 is provided with a projection 26 projecting from the upper end face thereof for restricting the rotation angle of the pin member 25 to 90 degrees. With the construction described above, it can be immediately confirmed before attachment of the handle 19 to the stem 18 from the directions of the flat surface 22 and pin member 25 whether the ball valve is kept in an open or closed state. Thus, the angular positions of the pin member 25 and the flat surface 22 provide a visual indication of the angular position of the ball 2. Furthermore, as illustrated in FIGS. 2 and 6, since an end portion 2a of the ball 2 on the side of the valve seat 6 projects radially inwardly into the passageway 4 from the ball seat 17 by a prescribed length L, thereby locating a seal point x between the ball surface and the ball seat 17 outside an inflow port 2b of the ball 2, a good sealing effect can be obtained and maintained with exactitude even when misalignment between the surface of the ball 2 and the ball seat 17 arises at the open position of the ball valve.

The function of the embodiment of the ball valve with a built-in check valve according to the present invention will now be described.

The ball valve can be brought to its open or closed position by a substantially 90 degree rotation of the valve handle 19 to cause the through hole 5 of the ball 2 and the passageway 4 to communicate with or intersect each other. When the ball valve is in its open state as shown in FIG. 1, a fluid flows in the direction indicated by an arrow and the fluid pressure is exerted onto the valve body 7 of the check valve 3. When the fluid pressure becomes constant, the valve body 7 is pushed to the left in FIG. 1. As a result, there is formed between the valve body 7 of the check valve 3 and the valve seat 6 of the ball 2 a fluid path largre than that of a conventional ball valve, as illustrated in FIG. 2. Therefore, the fluid can flow smoothly in the direction indicated by arrows in FIG. 2. In addition, since the shoulder portion 10 of the valve body 7 is provided with the damping member 12 made of rubber or resin, if the valve body 7 is pushed by the fluid pressure to the leftmost position in FIG. 2, there is no fear of rattling noise being produced.

When the fluid pressure on one side of the valve body 7 becomes equal to that on the other side of the valve body 7, the valve body is biased to the rightmost position in FIG. 1 by the spiral spring 8 to close the inflow port 2b of the ball 2, thereby preventing a counter flow of the fluid. Since the sealing contact portion 9 of the valve body 7 is provided with the damping means 11 made of rubber or resin, there is no fear of rattling noise being produced when the valve body abuts against the valve seat 6 of the ball 2 either by the biasing force of the spiral spring 8 or by the higher fluid pressure on the left side than that on the right side of the valve body 7 in FIG. 1. In addition, a good sealing effect can be obtained and maintained by the damping member 11. Thus, since the sealing contact portion 9 of the valve body 7 is brought into seal contact with the valve seat 6 not by gravity but by the biasing force of the spring spring 8, the ball valve with the check valve 3 of the present invention can be set at any position of piping in any direction.

Attachment and detachment of the handle 19 relative to the stem 18 are often carried out in the mounting and/or maintenance work of a ball valve. In the present invention, since it is possible to attach the handle 19 to the stem 18 only through the engagement between the single flat surface 22 of the stem 18 and the single flat engaging surface 24, there is no fear of the handle 19 being attached in an erroneous direction to the stem 18. In addition, since the check valve 3 is set so as to fulfill its function when the flat surface 22 of the stem 18 is in parallel to the through hole 5 of the ball 2, it can be visually confirmed from the state of the flat surface 22 how the check valve 3 assumes its state. Furthermore, since the stem 18 is provided at a position immediately below the flat surface 22 and in parallel to the through hole 5 of the ball 2 with the pin member 25 so that when the pin member 25 is in parallel to the direction in which a fluid flows the ball valve is kept in its open state, whereas when the pin member 25 intersects the fluid flowing direction at right angles the ball valve is kept in its closed state, the open or closed state of the ball valve can be visually confirmed from the angular position or direction of the pin member 25. This eliminates a possibility that a fluid to be prevented from flowing it caused to flow by mistake. The stem housing portion 1a of the valve casing 1 is provided on the upper end thereof with the projection 26 for restricting the rotation of the pin member 25 made by the operation of the handle 19 to 90 degrees. Since the handle 19 thus can be operated only in one direction when the ball valve is kept in its open or closed position, there is no fear of the check valve 3 moving from the inflow port 2b of the ball valve 2 to the outflow port thereof.

As has been described in the foregoing, according to the present invention, there is provided a vall valve with a built-in check valve making material cost and mounting cost lower and an exclusive mounting space smaller than a conventional case requiring mounting of a check valve and a shutoff valve in parallel. In addition, the ball valve according to the present invention is free from restraint as regards the mounting position and direction relative to the piping in which it is installed, has a construction such that the fluid resistance is very low, and can prevent a rattling noise from being produced even when fluid pressure is exerted therein either in the normal direction or in the reverse direction.

Furthermore, according to the present invention, since the state of the check valve and the open/closed state of the ball valve can be confirmed from the state of the flat surface of the stem and from the state of the pin member, any erroneous action of the ball valve can be avoided. Since the handle can easily be attached to and detached from the stem, the workability of mounting or maintenance becomes very high. Even when there is produced misalignment between the surface of the ball and the valve seat in the open state of the ball valve, the misalignment will not constitute an obstacle to the sealing effect of the ball valve.

What is claimed is:

1. A ball valve with a built-in check valve, comprising:
   a valve casing having a passageway for a fluid and having a stem housing portion for housing a valve stem, a valve handle detachably attachable on said valve stem, said stem housing portion having an outer groove, said valve handle having an inner groove at a position corresponding to a position of said outer groove when the valve handle is detachably attached on said valve stem, a split type snap ring received in said inner and outer grooves, said snap ring being received, when radially contracted, on the bottom of said outer groove and being received, when radially expanded, on the bottom of said inner groove;
   a ball having a through hole formed therein and having a valve seat formed inside thereof at a position in the vicinity of one end of the through hole thereof and being rotatably house in said valve casing and attached to said valve stem, the through hole of said ball and the fluid passageway of said valve casing being capable of communicating with each other by substantially 90 degree rotation of said ball in a normal direction through said valve stem and being capable of cutting off their communication by substantially 90 degree rotation of said ball in a reverse direction through said valve stem;
   a built-in check valve received within the through hole of said ball for cutting off the communications between the fluid passageway and the through hole and preventing a counter flow of the fluid, the built-in check valve having a valve body which has a sealing contact portion and a shoulder portion;

a guide bush provided within the through hole of said ball for guiding said valve body of said check valve;

a spring disposed on said guide bush for biasing said check valve in the direction of forming a seal contact between said sealing contact portion of said check valve and said valve seat of said ball and allowing said shoulder portion of said valve body of said check valve to abut against an end face of said guide bush when said valve body of said check valve has been retracted by pressure of the fluid exerted on said check valve against the biasing force of said spiral spring; and damping members attached to said sealing contact portion and said shoulder portion of said value body of said check valve.

2. A ball valve with a built-in check valve according to claim 1, wherein said valve casing is provided with a ball seat; and said ball has an end portion on the side of said valve seat projecting from said ball seat, thereby disposing a sealing point between said ball and said ball seat outside of an inflow port of said ball.

3. A ball valve with built-in check valve, comprising: a valve casing having a fluid passageway therethrough; a ball valve member mounted to undergo angular displacement within the valve casing between open and closed positions, the ball valve member having therein a through-hole positioned to communicate with the fluid passageway in the valve casing when the ball valve member is in the open position and to shut off communication with the fluid passageway in the valve casing when the ball valve member is in the closed position; a check valve mounted within the through-hole of the ball valve member for permitting fluid to flow in one direction through the through-hole and preventing fluid flow in the counter direction, the check valve comprising a movable check valve member movable between a closed position wherein the check valve member sealingly engages with a valve seat formed on the ball valve member to thereby prevent fluid flow in the counter direction and an open position wherein the check valve member is spaced from the valve seat to thereby permit fluid flow in the one direction, guiding means for guiding the movement of the check valve member and engageable with the check valve member when the same moves to its fully open position, spring means for urging the check valve member toward its closed position, and damping means for damping impact of the check valve member with the valve seat when the check valve member moves to its closed position and for damping impact of the check valve member with the guiding means when the check valve member moves to its fully open position; and a valve stem turnably mounted within the valve casing and having one end connected to the ball valve member to effect angular displacement thereof in response to turning of the valve stem and another end projecting out of the valve casing for detachable attachment to a valve handle for use in turning the valve stem, the valve stem having means for visually indicating whether the ball valve member is in the open or closed position.

4. A ball valve with built-in check valve according to claim 3, wherein the means for visually indicating comprises a pin member extending laterally through a portion of the valve stem which projects out of the valve casing, the pin member extending parallel to the through-hole in the ball valve member so that the angular position of the pin member corresponds to the angular position of the ball valve member thereby providing a visual indication of the angular position of the ball valve member.

5. A ball valve with built-in check valve according to claim 4; including means engageable with the pin member for restricting the extent of turning movement of the valve stem within predetermined limits to thereby restrict the extent of angular displacement of the ball valve member.

6. A ball valve with built-in check valve according to claim 5; wherein the means for resricting includes means for restricting the turning movement of the valve stem to substantially 90 degrees.

7. A ball valve with built-in check valve according to claim 3; wherein the means for visually indicating comprises a single flat surface formed on the valve stem at a portion thereof which projects out of the valve casing, the single flat surface extending parallel to the through-hole in the ball valve member so that the angular position of the single flat surface corresponds to the angular position of the ball valve member thereby providing a visual indication of the angular position of the ball valve member.

8. A ball valve with built-in check valve according to claim 7; wherein the valve handle has an opening therein having a single flat surface which conforms to the single flat surface of the valve stem so that the valve handle can only be detachably attached to the valve stem when the valve handle and valve stem are in one predetermined orientation relative to one another.

9. A ball valve with built-in check valve according to claim 3; including means defining an annular groove in the periphery of the portion of the valve stem which projects out of the valve casing, and a snap ring disposed within the annular groove and coacting with another groove in the periphery of the valve handle to enable detachable attachment of the valve handle to the valve stem.

10. A ball valve with built-in check valve according to claim 3; wherein the valve casing has a ball seat for the ball valve member, the ball valve member being in sliding sealing enagement with the ball seat and having a radially inwardly projecting end portion which projects inwardly into the through-hole beyond the ball seat so that the ball valve member sealingly engages with the ball seat at a location radially spaced from the through-hole.

11. A ball valve with built-in check valve according to claim 3; wherein the damping means comprises damping members carried by the check valve member, the damping members being composed of rubber or resin.

12. A ball valve with built-in check valve according to claim 3, wherein the guiding means comprises a tubular guide bush disposed within the through-hole and within which slidably mounted the check valve member, and a bush holder secured to the ball valve member and supporting the guide bush within the through-hole.

* * * * *